United States Patent

Nguyen et al.

Patent Number: 5,905,746
Date of Patent: May 18, 1999

[54] Q-SWITCH LASER METHOD AND APPARATUS

[75] Inventors: Phuoc K. Nguyen, Winter Springs; Ronald R. Selleck, Winter Park, both of Fla.

[73] Assignee: Litton Systems, Inc., Woodland Hills, Calif.

[21] Appl. No.: 08/904,066

[22] Filed: Aug. 1, 1997

[51] Int. Cl.⁶ .......................................... H01S 3/11
[52] U.S. Cl. ..................... 372/12; 372/98; 372/92; 372/9
[58] Field of Search .................. 372/10–12, 92, 372/98, 9, 18

[56] References Cited

U.S. PATENT DOCUMENTS

| | | | |
|---|---|---|---|
| 4,019,156 | 4/1977 | Fountain et al. | 372/18 |
| 5,001,716 | 3/1991 | Johnson et al. | 372/12 |
| 5,005,176 | 4/1991 | Lam et al. | 372/10 |
| 5,355,383 | 10/1994 | Lockard | 372/12 |
| 5,381,431 | 1/1995 | Zayhowski | 372/10 |
| 5,388,114 | 2/1995 | Zarrabi et al. | 372/11 |
| 5,394,413 | 2/1995 | Zayhowski | 372/11 |
| 5,646,952 | 7/1997 | Whittley | 372/19 |

*Primary Examiner*—Leon Scott, Jr.
*Attorney, Agent, or Firm*—William M. Hobby, III

[57] ABSTRACT

A Q-switch laser apparatus includes a laser cavity formed with a pair of reflective surfaces having a laser medium mounted therebetween and a power supply operatively connected to the laser cavity to pump the laser medium. An electro-optic Q-switch is mounted in the laser cavity in a saturable absorber of less than 100% saturable transmittance is located in the laser cavity between the laser medium and the electro-optic Q-switch for suppressing prelasing in the laser. The saturable absorber may be a Cr4+:YAG used with an electro-optic Q-switch of LiNbO₃. The method includes selecting the laser apparatus and selecting a saturable absorber of less than 100% saturable transmittance and attaching the selected saturable absorber in the laser cavity between the laser medium and the electro-optic Q-switch for suppressing prelasing therein.

14 Claims, 1 Drawing Sheet

Q-SWITCH LASER METHOD AND APPARATUS

BACKGROUND OF THE INVENTION

The present application relates to the suppression of prelasing in an electro-optic Q-switch laser and especially to the use of a saturable absorber placed in the laser cavity to prevent prelasing.

In a passive Q-switch, a material of non-linear absorption characteristics is inserted into a laser cavity. At low power levels, the material has high absorption blocking one of the mirrors from the laser medium. When the pump energy source is pulsed, the amount of light in the laser cavity builds up, eventually reaching a level where the cavity Q increases and a Q-switched pulse is produced.

Prelasing is an undesirable condition in Q-switch lasers in which an output pulse is emitted prematurely. It is frequently caused by the degradation of the laser system contrast ratio due to optical stress, low quality polarizers, misalignment, or charge build-up on the Q-switch crystal. A variety of techniques have been used to reduce or eliminate prelasing including maintaining the high contrast level of the laser system with delicate bonding techniques used to minimize optical stress and using stringent requirements in connection with polarizing components and alignment procedures. Radioactive ionizing sources have also been employed to prevent static charged build-up on a $LiNbO_3$ Q-switch crystal in low humidity and in changing temperature environments.

In one prior U.S. Pat. No. 5,355,383 to Lockard, a method and apparatus for the detection and control of prelasing in a Q-switch laser detects prelasing in the Q-switch laser and terminates the laser operation upon the detection. A detector senses the presence of light beyond a Q-switch and generates an appropriate electrical signal. A comparison stage circuit compares the detected signal with an established threshold value indicative of prelasing and generates a trigger signal if the detector signal exceeds the threshold value. In another prior U.S. patent to Lam et al., U.S. Pat. No. 5,005,176, a method and apparatus for Q-switching a laser uses a multiple quantum well or MQW integrated into a laser cavity to implement an active Q-switch device. The MQW initially absorbs and stores energy to prevent the device from lasing. In response to an applied electrical field, the MQW experiences a sudden charged carrier population inversion and emits a strong short duration pulse having a directionality coincident with that of the beam within the lasing cavity.

The present invention is directed towards preventing an electro-optic Q-switch laser from prelasing and the premature output of the laser energy and positions a saturable absorber in the laser cavity and aligned with a laser beam by reducing the system sensitivity to stress, alignment and polarizing component quality. The low transmittance in the absorber prevents prelasing and, after the Q-switch turn on of the laser, the absorber saturates into a high transmittance component allowing proper lasing with low loss.

SUMMARY OF THE INVENTION

A Q-switch laser apparatus includes a laser cavity formed with a pair of reflective surfaces having a laser medium mounted therebetween and a power supply operatively connected to the laser cavity to pump the laser medium. An electro-optic Q-switch is mounted in the laser cavity and a saturable absorber is located in the laser cavity between the laser medium and the electro-optic Q-switch for suppressing prelasing in the laser. The saturable absorber may be a Cr4+:YAG used with an electro-optic Q-switch of $LiNbO_3$. The method includes selecting the laser apparatus and selecting a saturable absorber of predetermined saturable transmittance and attaching the selected saturable absorber in the laser cavity between the laser medium and the mirror for suppressing prelasing therein.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
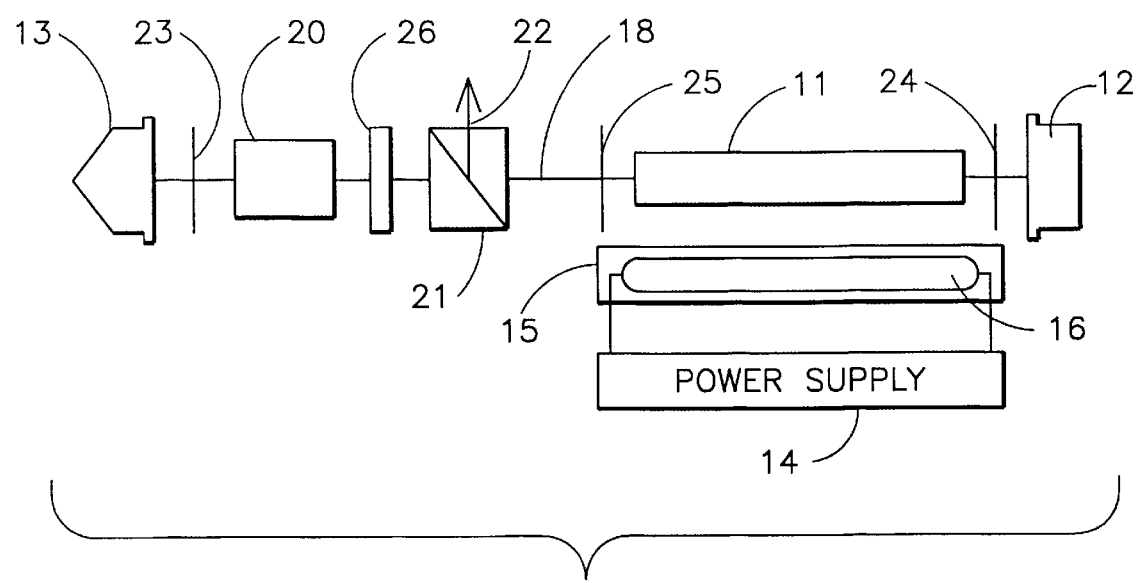
FIG. 1 is a diagrammatic view of the Q-switch laser in accordance with the present invention.

In a Q-switched laser, the term prelase refers to the undesirable condition in which the laser energy builds up during the hold-off period prior to Q-switching. This condition results in the premature output of the laser energy. It may be the result of excessive leakage or the degradation of the polarization contrast ratio in the Q-switch leg during hold-off.

The necessary condition for a successful hold-off is:

Component Transmittance·Leakage·Gain·Reflectivity<1

Gain is the double pass small signal gain just prior to Q-switching; reflectivity refers to the resonator reflectivity. Ignoring component transmittance, which is close to unity, and rearranging the above inequality yields:

$$\text{Leakage} < \frac{1}{\text{Gain} \cdot \text{Reflectivity}}$$

When leakage overcomes the factor, 1/(Gain*Reflectivity), prelase will occur. Placing a saturable absorber in the resonator modifies the laser inequality as followed:

$$\text{Leakage} \cdot T(off)^2 < \frac{1}{\text{Gain} \cdot \text{Reflectivity}}$$

For a saturable absorbing sample with an unsaturated transmittance, T(off), at 50%, the laser system may hold off with a 4-fold, (1/T(off)^2), increase in allowable leakage, as compared to the conventional system without a saturable absorber. Since the saturated transmittance, T(on), of the absorber is not 100%, the gain of the system must be increased to maintain comparable output energy, reducing the best case allowable leakage mentioned above. In general, the factor 1/T(off)^2 increases faster than the additional gain required to compensate for the saturable absorber transmittance and results in a significant increase in the allowable leakage in the system. Furthermore, the position of the saturable absorber in the resonator may be varied to optimize the performance of the system.

In FIG. 1, a Q-switch laser 10 is defined by a laser cavity having a laser medium 11 positioned between a pair of reflectors 12 and 13. A power source 14 is connected to a laser pump 15 having a flashlamp 16 (or diode pump) therein positioned for pumping the laser medium 11. When stimulated emission is achieved, the laser beam will follow the beam path 18 between the reflectors 12 and 13 and through an electro-optical Q-switch 20. The output energy 22 is retrieved from the cavity with the output coupling polarizer 21 reducing the circulating beam 18. A waveplate 23 is placed at one end of the cavity while a waveplate 24 is placed at the other end. A reflectivity waveplate 25 is placed between the laser medium 11 and the output coupling polarizer 21. A saturable absorber 26 is placed between the Q-switch 20 and the polarizer 21. The laser may include reflectors 12 and 13 which may be porro prism reflectors. A YAG laser medium 11, such as Nd:YAG may be used, and the electro-optic Q-switch may be of LiNbO$_3$. The saturable absorber 26 can be of Cr4+:YAG.

The method of the present invention involves the making of a Q-switch laser for suppressing prelase which includes the step of selecting a laser having a laser cavity formed with a pair of reflective surfaces and having a laser medium mounted therebetween in accordance with the apparatus described herein and operatively coupling a power supply to drive a flashlamp or the like for pumping the laser medium. An electro-optic Q-switch is incorporated into the laser cavity to form a Q-switch laser and saturable absorber which may be less than 100% saturated transmittance, such as Cr4+:YAG, is selected and is positioned in the laser cavity between the Q-switch and the mirror or laser medium, such that the Q-switch laser beam is also passing through the saturable absorber.

It should be clear at this time that the present invention suppresses prelasing in a electro-optic Q-switch by using a saturable absorber to reduce the system sensitivity to stress alignment and polarizing component quality by increasing the contrast ratio of the system and that after the Q-switch is turned on, the saturable absorber is turned into a high transmittance component allowing proper laser operation with low loss. However, the present invention should not be construed as limited to the forms shown which are to be considered illustrative rather than restrictive.

We claim:

1. A prelasing suppression Q-switched laser apparatus comprising:
    a laser cavity having a pair of reflective surfaces;
    a laser medium mounted in said laser cavity;
    a power supply operatively connected to said laser cavity to pump said laser medium;
    an electro-optic Q-switch mounted in said laser cavity; and
    a saturable absorber of predetermined saturable transmittance located in said laser cavity between one said reflective surface and said electro-optic Q-switch to prevent pre-lasing in said laser until said electro-optic Q-switch is turned on.

2. A Q-switched laser apparatus in accordance with claim 1 in which said saturable absorber is Cr4+:YAG.

3. A Q-switched laser apparatus in accordance with claim 2 in which said electro-optic Q-switch is a LiNbO$_3$ Q-switch.

4. A Q-switched laser apparatus in accordance with claim 2 in which said laser medium is Nd:YAG.

5. A Q-switched laser apparatus in accordance with claim 1 including a waveplate positioned adjacent each reflective surface in said laser cavity.

6. A Q-switched laser apparatus in accordance with claim 5 including a waveplate positioned between said laser medium and said output coupling polarizer.

7. A Q-switched laser apparatus in accordance with claim 6 in which said output is positioned in said laser cavity between said laser medium and said Q-switch.

8. A method of making a Q-switched laser that suppresses pre-lasing in the laser comprising the steps of:
    selecting a laser cavity having a pair of reflective surfaces;
    selecting a laser medium mounted in said selected laser cavity;
    operatively coupling a power supply to said laser cavity for pumping said laser medium;
    mounting an electro-optic Q-switch in said selected laser cavity;
    selecting a saturable absorber of predetermined saturated transmittance of less than 100% transmittance; and
    attaching said selected saturable absorber in said laser cavity between one said reflective surface and said electro-optic Q-switch whereby a laser is formed that suppresses pre-lasing until said electro-optic Q-switch is turned on.

9. A method of making a Q-switched laser that suppresses pre-lasing in the laser in accordance with claim 8 in which the step of selecting a saturable absorber includes selecting a Cr4+:YAG saturable absorber.

10. A method of making a Q-switched laser that suppresses pre-lasing in the laser in accordance with claim 9 in which the step of mounting an electro-optic Q-switch includes mounting a LiNbO$_3$ Q-switch.

11. A method of making a Q-switched laser that suppresses pre-lasing in the laser in accordance with claim 10 in which the step of selecting a laser cavity medium includes selecting a laser cavity having a laser medium of Nd:YAG.

12. A method of making a Q-switched laser that suppresses pre-lasing in the laser in accordance with claim 11 including the step of mounting a pair of waveplates in said laser cavity, one positioned adjacent each reflective surface in said laser cavity.

13. A method of making a Q-switched laser that suppresses pre-lasing in the laser in accordance with claim 12 including the step of mounting an output coupling polarizer positioned in said laser cavity between said laser medium and said Q-switch.

14. A method of making a Q-switched laser that suppresses pre-lasing in the laser in accordance with claim 13 including the step of mounting a waveplate between said laser medium and said output coupling polarizer.

* * * * *